United States Patent
Cao

(10) Patent No.: US 10,334,512 B2
(45) Date of Patent: *Jun. 25, 2019

(54) NETWORK ACCESS METHOD AND MOBILE TERMINAL

(71) Applicant: Guangdong Oppo Mobile Telecommunications Corp., Ltd., Dongguan, Guangdong (CN)

(72) Inventor: Jun Cao, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 72 days.

This patent is subject to a terminal disclaimer.

(21) Appl. No.: 15/478,905

(22) Filed: Apr. 4, 2017

(65) Prior Publication Data
US 2017/0208538 A1    Jul. 20, 2017

Related U.S. Application Data

(63) Continuation of application No. PCT/CN2016/086234, filed on Jun. 17, 2016.

(30) Foreign Application Priority Data

Jun. 19, 2015  (CN) .......................... 2015 1 0347480

(51) Int. Cl.
*H04W 4/00* (2018.01)
*H04W 48/16* (2009.01)
(Continued)

(52) U.S. Cl.
CPC .......... *H04W 48/16* (2013.01); *H04W 8/183* (2013.01); *H04W 8/22* (2013.01); *H04W 8/26* (2013.01); *H04W 48/18* (2013.01)

(58) Field of Classification Search
CPC ....... H04W 48/16; H04W 8/183; H04W 8/22; H04W 8/26; H04W 48/18
See application file for complete search history.

(56) References Cited

U.S. PATENT DOCUMENTS 9,344,877 B1    5/2016  Arugonda et al.
9,668,203 B2 *  5/2017  Zhang ................... H04W 48/18
(Continued)

FOREIGN PATENT DOCUMENTS

CN    101031145 A    9/2007
CN    101252740 A    8/2008
(Continued)

OTHER PUBLICATIONS

3GPP (Cape town, South Afrika, May 5-9, 2008, C1-081972, NEC, Equivalent PLMNs list handling in EPS) (Year: 2008).*
(Continued)

*Primary Examiner* — Maharishi V Khirodhar
(74) *Attorney, Agent, or Firm* — Young Basile Hanlon & MacFarlane, P.C.

(57) ABSTRACT

Provided is a network access method and the method includes the follows. Information of a user identification card pre-stored by a mobile terminal is acquired from a storage space and all network types supported by the mobile terminal are determined based on the pre-stored information of the user identification card. Network identities (IDs) of Public Land Mobile Networks (PLMNs) of all network types are determined based on the network types supported by the mobile terminal, and the network IDs of the PLMNs of all network types are added to an equivalent home public land mobile network (EHPLMN) list. When the mobile terminal arrives at a visited place from a designated location and starts a network search, when a target PLMN that matches at least one network identity in the EHPLMN list is (Continued)

found, a communication connection between the mobile terminal and the target PLMN is established.

16 Claims, 4 Drawing Sheets

(51) Int. Cl.
  *H04W 48/18* (2009.01)
  *H04W 8/18* (2009.01)
  *H04W 8/22* (2009.01)
  *H04W 8/26* (2009.01)

(56) References Cited

U.S. PATENT DOCUMENTS

| | | | |
|---|---|---|---|
| 9,974,009 B2* | 5/2018 | Cao | H04W 48/18 |
| 10,015,731 B2* | 7/2018 | Cao | H04W 24/02 |
| 2008/0220773 A1* | 9/2008 | Buckley | H04W 48/18 455/433 |
| 2008/0026165 A1 | 10/2008 | Salters et al. | |
| 2014/0031035 A1* | 1/2014 | Tagg | H04W 48/18 455/433 |
| 2014/0235241 A1* | 8/2014 | Sharan | H04W 60/04 455/435.2 |
| 2014/0235541 A1* | 8/2014 | Duggan | A61K 38/2278 514/13.1 |
| 2015/0296364 A1* | 10/2015 | Peruru | H04W 8/005 455/434 |

FOREIGN PATENT DOCUMENTS

| | | |
|---|---|---|
| CN | 101742482 A | 6/2010 |
| CN | 102368865 A | 3/2012 |
| CN | 102905346 A | 1/2013 |
| CN | 103906180 A | 7/2014 |
| CN | 104159210 A | 11/2014 |
| CN | 104980999 A | 10/2015 |
| CN | 105554726 A | 5/2016 |
| EP | 2608606 A1 | 6/2013 |
| EP | 3169109 A1 | 5/2017 |
| WO | 2014107855 A1 | 7/2014 |

OTHER PUBLICATIONS

3gpp (R3-111912, Meeting #73, Athens, Greece, Aug. 22-26, 2011, The MDT applicability of Equivalent PLMN identities) in further view of Sharan et al. (US 2014/0235241 A1). (Year: 2011).*

3GPP (ETSI TS 123 122 V 6.5.0 (Jun. 2005), digital cellular telecommunications system (Phase 2+), TS 23.122 version 6.5.0 release 6). (Year: 2005).*

GPP (Cape town, South Afrika, May 5-9, 2008, C1-081972, NEC, Equivalent PLMNs list handling in EPS) (Year: 2008).*

3gpp (R3-111912, Meeting #73, Athens, Greece, Aug. 22-26, 2011, The MDT applicability of Equivalent PLMN indentities) (Year: 2011).*

3GPP, Digital cellular telecommunications system (Phase 2+); Universal Mobile Telecommunications Systems (UMTS); Service accessbility (3GPP TS 22.011 version 7.9.0 Release 7),Technical Specification, Mar. 31, 2008, 21 pgs.

3GPP, "The MDT applicability of Equivalent PLMN identities", TSG-RAN WG3 Meeting #73, Athens, Greece, Aug. 22-26, 2011, 4 pgs.

"3rd Generation Partnership Project; Technical Specification Group Core Network and Terminals; Non-Access-Stratum (NAS) functions related to Mobile Station (MS) in idle mode (Release 12)", 3GPP Standard; 3GPP TS 23.122, 3rd Generation Partnership Project (3GPP), Mobile Competence Centre ; 650, Route Des Lucioles ; F-06921 Sophia-Antipolis Cedex ;France, vol. CT WG1, No. V12.6.0, Mar. 19, 2015 (Mar. 19, 2015), pp. 1-46, XP050927767, p. 17-p. 24.

"3rd Generation Partnership Project; Technical Specification Group Core Network and Terminals; Characteristics of the Universal Subscriber Identity Module (USIM) application (Release 12)", 3GPP Standard; 3GPP TS 31.102, 3rd Generation Partnership Project (3GPP), Mobile Competence Centre ; 650, Route Des Lucioles ; F-06921 Sophia-Antipolis Cedex ;France, vol. CT WG6, No. V12.6.0, Jan. 6, 2015 (Jan. 6, 2015), pp. 1-253, XP050927413, pp. 60,88.

Extended European search report issued in corresponding European application No. 16811034.4 dated Mar. 16, 2018.

* cited by examiner

NETWORK ACCESS METHOD AND MOBILE TERMINAL

CROSS-REFERENCE TO RELATED APPLICATION(S)

This application is a continuation of international application No. PCT/CN2016/086234, filed on Jun. 17, 2016, which claims priority to Chinese Patent Application No. 201510347480.3, filed on Jun. 19, 2015, the contents of both of which are herein incorporated by reference in their entireties.

TECHNICAL FIELD

The present disclosure relates to the field of mobile communication, and particularly to a network access method and a mobile terminal.

BACKGROUND

A Public Land Mobile Network (PLMN) is a network established and operated by governments and approved operators for providing the public with land mobile communication business. The PLMN is generally interconnected with a public switched telephone network to form a communication network of the whole region or country.

Generally, the identity ("ID" for short) of the PLMN is a string of numbers, for example, the network ID of the PLMN of China Mobile is 46000, and the network ID of the PLMN of China Unicom is 46001. Users can communicate with each other conveniently and quickly via mobile networks provided by various operators. With an improvement of people's living standard, there are more and more users carrying communication terminal equipment. When a user arrives at a visited place that is not the home of a card of a mobile terminal such as a mobile phone, the mobile phone needs to look for a network to obtain the network ID of the PLMN.

However, in the existing technology, when searching a network, the mobile phone needs to keep searching and attempts to connect to a searched network. The mobile phone cannot make network access until a network type supported by the mobile phone is found after continuous attempt, it takes a long time to connect to a network; a continuous network connection attempt of the mobile phone can result in large power consumption and poor user communication experience.

BRIEF DESCRIPTION OF THE DRAWINGS

In order to illustrate the technical solutions of the implementations of the present disclosure more clearly, the drawings used in the implementations will be briefly described, it will be apparent that the drawings described in the following are implementations of the present disclosure, and it will be apparent to those skilled in the art that other drawings can be obtained from the drawings without any creative work.

DETAILED DESCRIPTION

Technical solutions of the present disclosure will be described clearly and completely with reference to the accompanying drawings; obviously, the implementations described below are merely part of rather than all of the implementations of the present disclosure. Based on the implementations of the present disclosure, other implementations obtained there from without any creative work by those of ordinary skill in the art shall fall into the protection scope of the present disclosure.

Implementations of the present disclosure provide a network access method and a mobile terminal, so as to reduce the length of time that the mobile terminal takes to connect to a Public Land Mobile Network (PLMN), and enhance user communication experience on the mobile terminal.

In the network access method of the implementation of the present disclosure, perform network ID match before network connection. First, information of a user identification card is acquired first, then all network types supported by the mobile terminal as well as network IDs of PLMNs of all the network types can be determined; when a target PLMN is searched or found during a network search, conduct network connection only if there is a successful network ID match operation.

Figure 1:
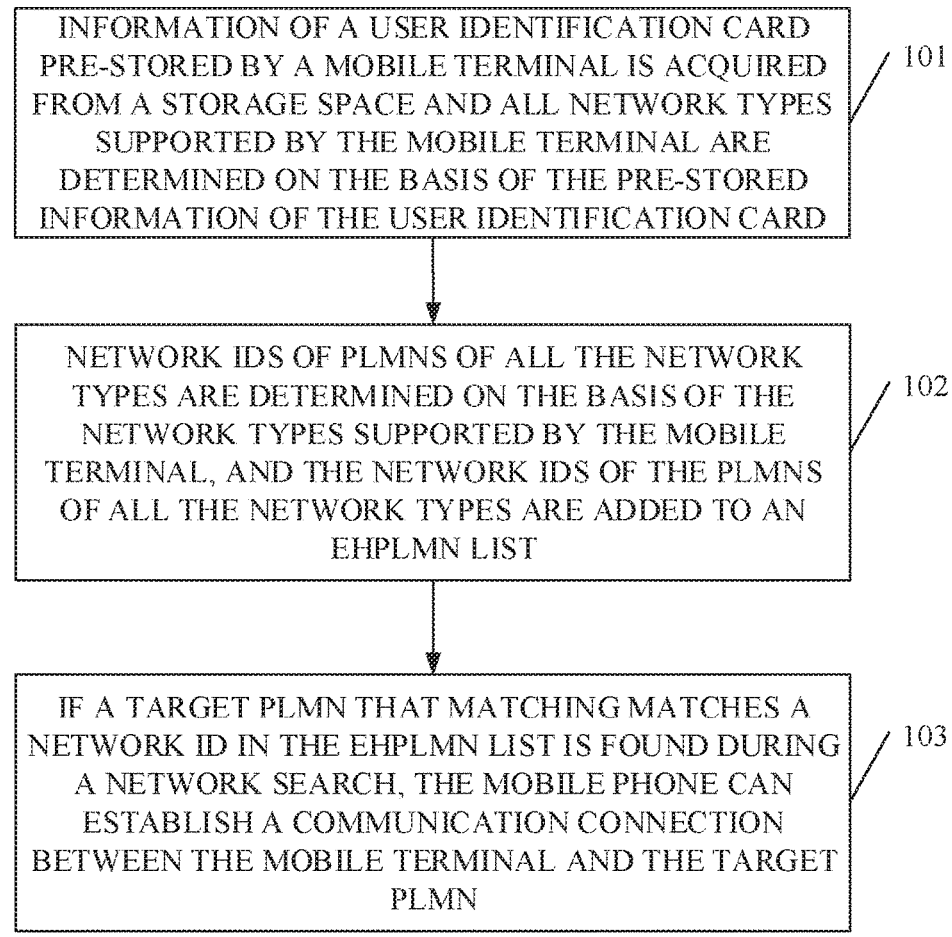
FIG. 1 is a flow chart diagram of a network access method of an implementation of the present disclosure.

Referring to FIG. 1, FIG. 1 is a flow chart diagram of a network access method of an implementation of the present disclosure. The method illustrated in FIG. 1 is applicable to an intelligent mobile terminal (such as an Android mobile phone, an IOS mobile phone, and the like). As illustrated in FIG. 1, the network access method can begin at block 101.

At block 101, information of a user identification card pre-stored by a mobile terminal is acquired from a storage space and all network types supported by the mobile terminal are determined on the basis of the pre-stored information of the user identification card.

In some implementations, take mobile phones as an example of the mobile terminal for explanation. The "user identification card" described herein can be specifically a SIM (Subscriber Identification Module) card or a universal subscriber identity module (USIM) card of a mobile phone, and the above-mentioned information of the user identification card can include: the operator of the SIM card (for example, China Mobile, China Unicom or China Telecom, and the like), network types supported by the SIM card (will be described in detail later), and the subscriber of the SIM card (that is, the user ID of the mobile phone user bonded with the SIM card).

During implementation, the mobile phone can pre-store the information of the SIM card thereof in a built-in storage space (that is, a mobile phone build-in memory), an expanded storage space (such as a SD card), or a cloud storage space thereof (in the following, can be collectively referred to as "storage space"). When the mobile phone needs to establish an EHPLMN list used for network connection, the information of the SIM card of the mobile phone can be acquired first from the above mentioned storage space, based on which all network types supported by the SIM card of the mobile phone (mobile phone for short) can be determined, and then a corresponding EHPLMN list can be established on the basis of all the network types supported by the mobile phone.

In some implementations, the network type described herein can include the follows: CDMA (Code Division Multiple Access) 1X, 800 MHZ frequency band assigned for mobile phones in CDMA network standard; 900/1800/1900 MHZ frequency band assigned for mobile phones in GSM (Global System for Mobile Communication) network standard, and 900/1800 MHZ frequency band assigned for GSM 1X dual-model (that is, WCDMA(Wideband Code Division Multiple Access)) in recent years; 900/1800/1900/2100 MHZ frequency band assigned for mobile phones in 3G (the third generation) mobile communication technology network standard; and 1920-2170 MHZ frequency band assigned for mobile phones in 4G (the fourth generation) mobile communication technology network standard, and the present disclosure is not limited thereto.

At block 102, network IDs of PLMNs of all the network types are determined on the basis of the network types supported by the mobile terminal, and the network IDs of the PLMNs of all the network types are added to an EHPLMN list.

In some implementations, after network types supported by the SIM card of the mobile phone have been determined, based on the network types, the mobile phone can determine network IDs of PLMNs of said network types and add the network IDs of PLMNs of said network types to the EHPLMN list. That is, in implementations of the present disclosure, the mobile phone can predetermine network IDs of PLMNs of multiple network types supported by the mobile phone, and add the network IDs of PLMNs of the multiple network types to the EHPLMN list as well as save the EHPLMN list to the storage space. The EHPLMN list can be used for network ID match when the mobile phone searches networks and the mobile phone can attempt to connect to a network after a corresponding network ID has been found; it is possible to reduce the length of time consumed for network search and improve the efficiency of network connection.

In some implementations, the EHPLMN described herein is an equivalent PLMN of a PLMN currently selected by the mobile phone and has the same priority. The EHPLMN is mainly used in conjunction with mobile phones to solve "periodic network search of terminals, roaming signs appears, and faster power consumption" and other issues caused by single network-dual-number or even single network-multi-number.

In some implementations, the network ID of the PLMN described herein can include network number segments. For example, China Mobile includes four number segments, that is, 46000, 46002, 46007, and 46008; China Unicom includes three number segments, that is, 46001, 46006, 46009 and the like and there is no limit. Specifically, when the network types supported by the mobile phone have been determined, the mobile phone can add network IDs of the PLMNs of the network types to the EHPLMN list. For example, if the SIM card of the mobile phone is a SIM card of China Mobile, it can be determined that the network supported by the mobile phone is a network of China Mobile, and therefore, network number segments of the network of China Mobile can be added to the EHPLMN list.

Operations of block 101-block 102 can be repeated for multiple times according to actual needs and/or application scenarios.

At block 103, during a network search, for example, when the mobile terminal arrives at a visited place from a designated location and starts the network search, if a target PLMN that matches at least one network ID in the EHPLMN list is found, the mobile phone can establish a communication connection between the mobile terminal and the target PLMN.

In some implementations, when a mobile phone arrives at a visited place from the home of the SIM card thereof or arrives at a new visited place from a visited place that has already established a network connection and starts a network search, the mobile phone can scan to acquire the network ID of a PLMN broadcasted by a base station. After obtaining the network ID of the PLMN of the visited place via base station broadcast, the mobile phone can match the network ID of the PLMN obtained via scan with network IDs of PLMNs in the EHPLMN list. When a PLMN (that is, the target PLMN) that matches at least one network ID of the EHPLMN list is searched (in other words, found), the mobile phone can establish a communication connection with the target PLMN. That is, the mobile phone can first match the network ID of the searched PLMN with network IDs pre-stored in the EHPLMN list, and then establish a network connection after a successful match, there is no need to attempt communication connection for each searched PLMN as in the related art. Briefly, in the network access method of the implementation of the present disclosure, match before attempting a network connection, and it is possible to reduce wasted effort and improve the efficiency of network connection.

As can be seen from the implementations described above, information of the SIM card pre-stored by a mobile phone can be acquired from the storage space and network types supported by the mobile phone can be determined on the basis of the information of the SIM card; in addition, network IDs of PLMNs of the network types can be determined on the basis of the network types supported by the mobile phone, and the network IDs of the PLMNs of said network types can be added to the EHPLMN list based on which network ID match can be carried out, and network connection will be conducted if the match is successful. Since there is no need to attempt network connection for each searched network, it is possible to improve the efficiency of network search. When the mobile phone arrives at a visited place from a designated location and starts a network search, the mobile phone can match a searched network ID with network IDs stored in the EHPLMN list; if a target PLMN that matches at least one network ID stored in the EHPLMN list is obtained, a communication connection between the mobile phone and the target PLMN will be established. Therefore, it is possible to reduce the length of time that the mobile phone takes to connect to the PLMN, and thus can enhance user communication experience on the mobile phone.

Figure 2:
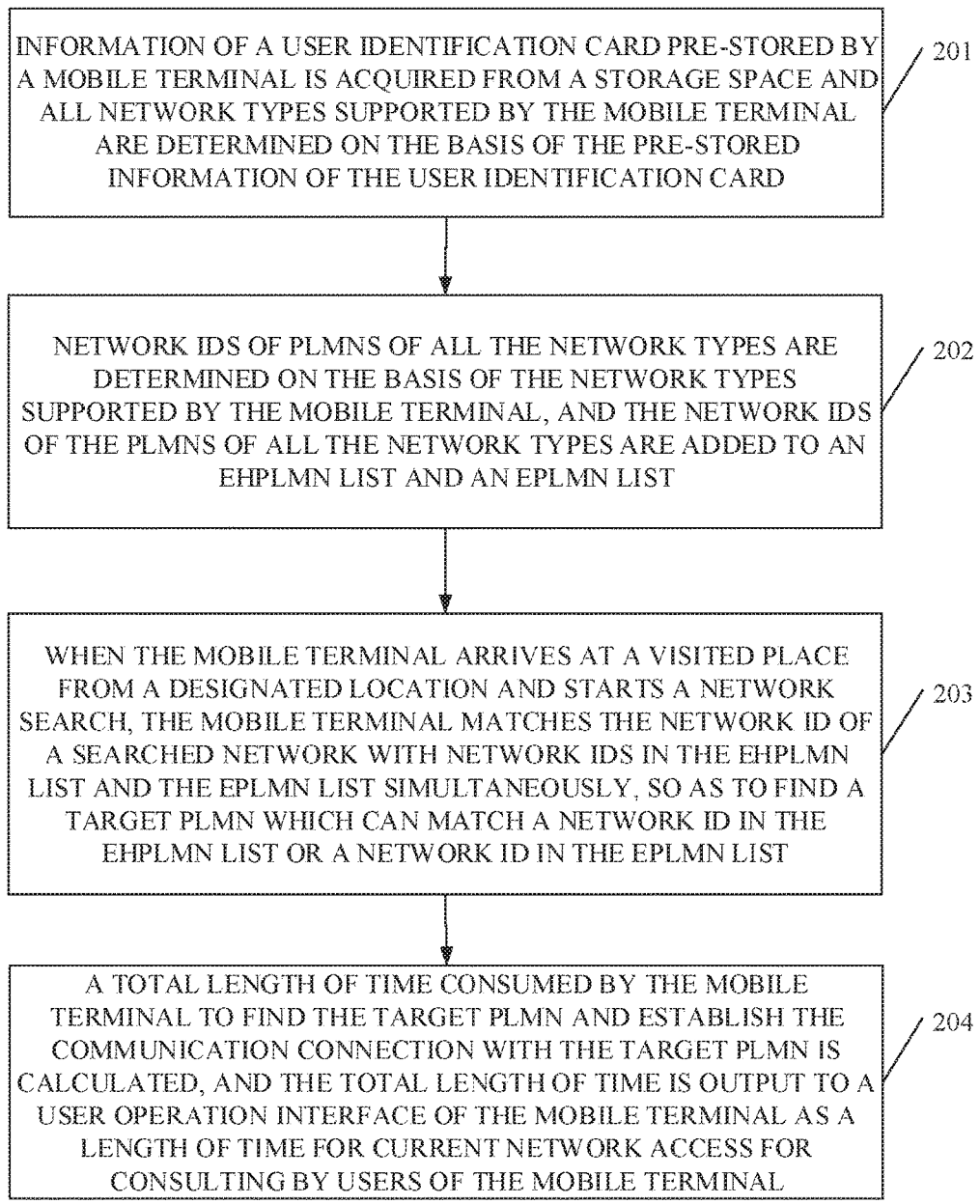
FIG. 2 is a flow chart diagram of another network access method of an implementation of the present disclosure.

Referring to FIG. 2, FIG. 2 is a flow chart diagram of another network access method of an implementation of the present disclosure. As illustrated in FIG. 2, the network access method can begin at block 201.

At block 201, information of a user identification card pre-stored by a mobile terminal is acquired from a storage space and all network types supported by the mobile terminal are determined on the basis of the pre-stored information of the user identification card.

During implementation, implementation of the process of determining network types supported by a mobile phone can refer to the description of block 101 of the first implementation, and it will not be repeated here.

At block 202, network IDs of PLMNs of all the network types are determined on the basis of the network types supported by the mobile terminal, and the network IDs of the PLMNs of all the network types are added to an EHPLMN list.

During implementation, implementation of the process of adding the network IDs of the PLMNs of the network types supported by the mobile phone to the EHPLMN list can refer to the description of block 102 of the first implementation, and it will not be repeated here.

Further, in some implementations, after determining the network IDs of the PLMNs of the network types supported by the mobile phone, the mobile phone can add network IDs of the PLMNs of the network types supported by the mobile phone to the EPLMN list; in this way, when the mobile phone arrives at a visited place and starts a network search, by searching networks via the EPLMN list, it is possible to increase the diversity of network search and increase the fun of network search.

At block 203, when the mobile terminal arrives at a visited place from a designated location and starts a network search, the mobile terminal matches the network ID of a searched network with network IDs in the EHPLMN list and the EPLMN list simultaneously, so as to find a target PLMN which can match at least one network ID in the EHPLMN list or a network ID in the EPLMN list.

During implementation, implementation of the process of matching the network ID of the searched network with network IDs in the EHPLMN list so as to find a target PLMN that matches at least one network ID in the EHPLMN list can refer to the description of block 103 of the first implementation, and it will not be repeated here.

Further, when a mobile phone arrives at a visited place and starts a network search, the mobile phone can match the network ID of the searched network with network IDs in the EPLMN list and the EHPLMN list simultaneously, so as to find a target PLMN that matches at least one network ID in the EPLMN list or the EHPLMN list. During implementation, since the way in which information is stored in different lists (the EPLMN list and the EHPLMN list) may be different and search strategies defined by different lists are not the same, the search speed that the mobile phone to search, from different lists (the EPLMN list and the EHPLMN list), a matched network ID of the network ID of the searched PLMN varies depending on the network IDs of PLMNs; for example, if the network ID that matches the network ID of the searched PLMN is different in storage location, the match speed between the network ID of the PLMN and network IDs in the lists may varies. According to the implementation of the present disclosure, by simultaneously matching the network ID of the searched PLMN with the EHPLMN list and the EPLMN list respectively, it is possible to improve the match efficiency of the network ID of the PLMN, shorten the match time of the network ID, and improve the efficiency of network search.

During implementation, by matching the network ID of the searched PLMN with the EHPLMN list and the EPLMN list respectively, the mobile phone can obtain a network ID that matches the network ID of the PLMN; after a target PLMN that matches at least one network ID stored in the EHPLMN list or the EPLMN list is searched, a communication connection between the mobile phone and the target PLMN can be established.

At block 204, a total length of time consumed by the mobile terminal to find the target PLMN and establish the communication connection with the target PLMN is calculated, and the total length of time is output to a user operation interface of the mobile terminal as a length of time for network access (in other words, a length of time for current network access) for consulting by users of the mobile terminal.

In some implementations, after the communication connection with the target PLMN is established, the mobile phone can calculate a total length of time consumed by the mobile phone to find the target PLMN and establish the communication connection with the target PLMN, and further output the total length of time to a user operation interface of the mobile terminal as a length of time for current network access for consulting by users of the mobile phone. The user operation interface of the mobile phone can be a mobile phone display such as a touch screen; however, the present disclosure is not limited thereto. After viewing the length of time for network access via the mobile phone display, users of the mobile phone can determine whether to feed back the length of time for network access, the visited place, and other information to the operator management platform of the SIM card of the mobile phone. If the mobile phone chooses to feed back the length of time for network access, the visited place, and other information to the operator management platform of the SIM card of the mobile phone, optimal management of network access time can be performed via the operator management platform of the SIM card of the mobile phone. Through optimization, the efficiency of mobile access of the mobile phone can be improved continuously, and user experience of the mobile phone can be enhanced.

According to implementations of the present disclosure, a mobile phone can acquire information of a SIM card pre-stored by the mobile phone from a storage space and determine, on the basis of the information of the SIM card, network types supported by the mobile phone, and can further determine, on the basis of the network types supported by the mobile phone, network IDs of PLMNs of the above mentioned network types and add the network IDs of the PLMNs of the above mentioned network types to the EHPLMN list and the EPLMN list, so as to conduct network ID match according to the EHPLMN list and the EPLMN list, and network connection will be conducted if the match is successful. Since there is no need to attempt network connection for each searched network, it is possible to improve the efficiency of network search. When the mobile phone arrives at a visited place from a designated location and starts a network search, the mobile phone can match a searched network ID with network IDs stored in the EHPLMN list; if a target PLMN that matches at least one network ID stored in the EHPLMN list or the EPLMN list is obtained, a communication connection between the mobile phone and the target PLMN will be established. Therefore, it is possible to reduce the length of time that the mobile phone takes to connect to the PLMN, and thus can enhance user communication experience on the mobile phone. According to implementations of the present disclosure, the length of time for network access can be fed back to an operator management platform of the SIM card of the mobile phone, and optimal management of network access time can be performed via the operator management platform of the SIM card. Through optimization, the efficiency of mobile access of the mobile phone can be improved continuously, and user experience of the mobile phone can be enhanced.

Figure 3:
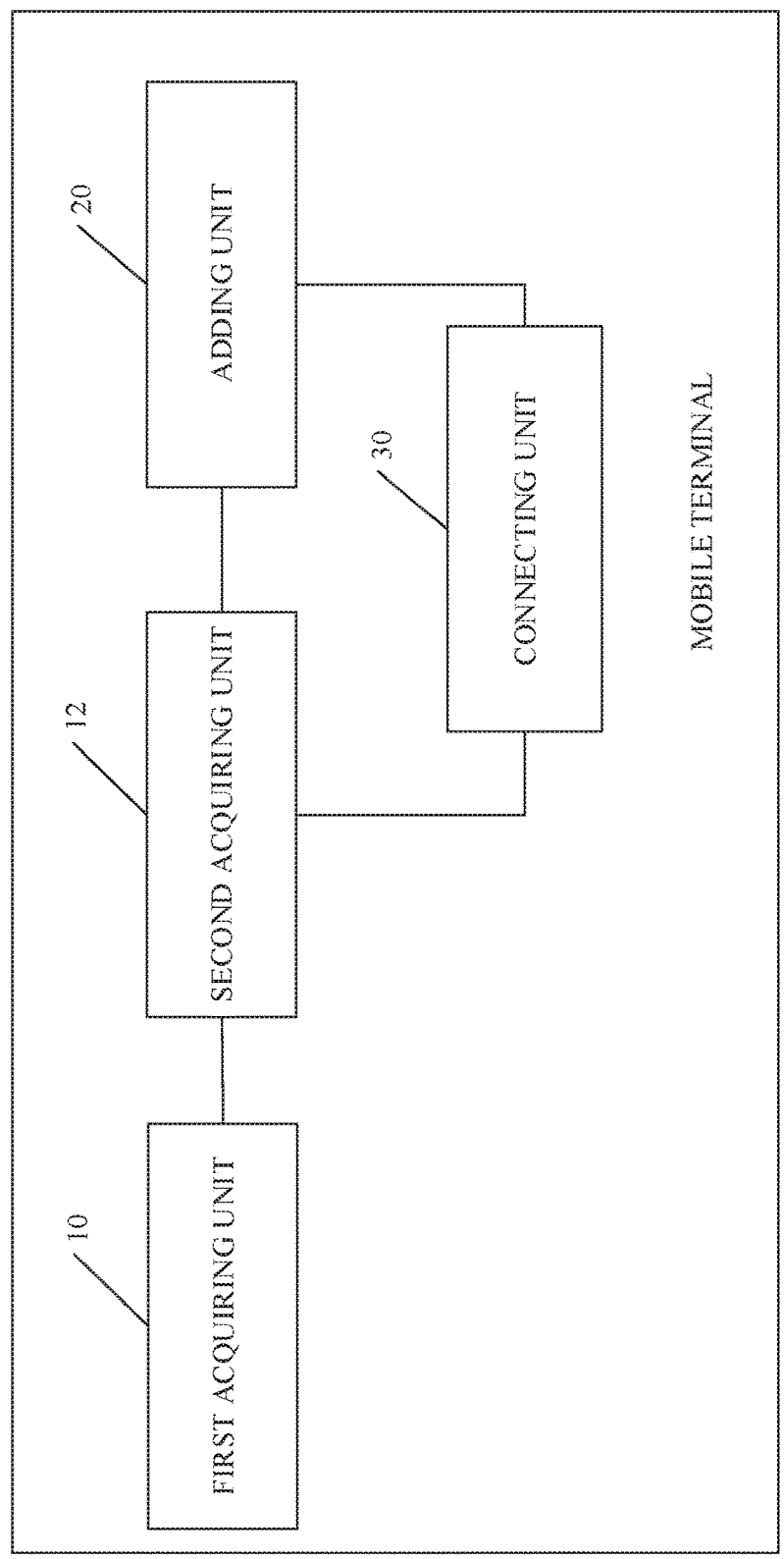
FIG. 3 is a structure diagram of a mobile terminal of an implementation of the present disclosure.

Referring to FIG. 3, FIG. 3 is a structure diagram of a mobile terminal of an implementation of the present disclosure, which can be applied to execute the network access method described in the implementation of the present disclosure. As illustrated in FIG. 3, the mobile terminal can include a first acquiring unit 10 (such as a data processor), a second acquiring unit 12 (such as a data processor), an adding unit 20 (such as a controller or a processor), and a connecting unit 30 (such as a connector or communicator). As one implementation, the first acquiring unit 10 and the second acquiring unit 12 can be integrated into one element.

Furthermore, the mobile terminal can include a hardware processor (not illustrated in the Figure) configured to perform the elements mentioned above or those described in the following. Specifically, the hardware processor can be connected with a memory via a BUS, where the memory is configured to store one or more programs, when executed by the hardware processor, adapted to perform the network access method or the elements of the mobile terminal according to implementations of the present disclosure.

The first acquiring unit 10 is configured to acquire information of a user identification card pre-stored by a mobile terminal from a storage space.

The second acquiring unit 12 is configured to acquire or determine, on the basis of the pre-stored information of the user identification card, all network types supported by the mobile terminal, and acquire or determine, on the basis of the network types supported by the mobile terminal, network IDs of PLMNs of all the network types.

The adding unit 20 is configured to add the network IDs of the PLMNs of all the network types acquired by the second acquiring unit 12 to an equivalent home public land mobile network (EHPLMN) list.

The connecting unit 30 is configured to establish a communication connection between the mobile terminal and a target PLMN that matches at least one network ID in the EHPLMN list, if the target PLMN is found when the mobile terminal arrives at a visited place from a designated location and starts a network search.

In some implementations, the first acquiring unit 10 is configured to: acquire information of the user identification card from a built-in storage space of the mobile terminal; or acquire information of the user identification card from a cloud storage space corresponding to the mobile terminal, wherein the information of the user identification card is pre-stored and backed up in the cloud storage space by the mobile terminal. The built-in storage space of the mobile terminal and the cloud storage space corresponding to the mobile terminal and the like can be collectively referred to as "storage space"

The user identification card can be a subscriber identification module (SIM) card or a universal subscriber identity module (USIM) card, and the information of the user identification card includes at least one of: the operator of the SIM card, network types supported by the SIM card, and the subscriber of the SIM card.

In some implementations, the adding unit 20 is further configured to add the network IDs of the PLMNs of the above-mentioned network types to an equivalent public land mobile network (EPLMN) list for network search of the mobile terminal.

The network ID can include a network number segment.

In some implementations, the connecting unit 30 can further include a match unit, which is configured to match the network ID of a searched network with network IDs in the EHPLMN list, so as to find a target PLMN that matches at least one network ID in the EHPLMN list; or to match the network ID of the searched network with the network IDs in the EHPLMN list and the EPLMN list simultaneously, so as to find a target PLMN that matches at least one network ID in the EHPLMN list or a network ID in the EPLMN list.

Figure 4:
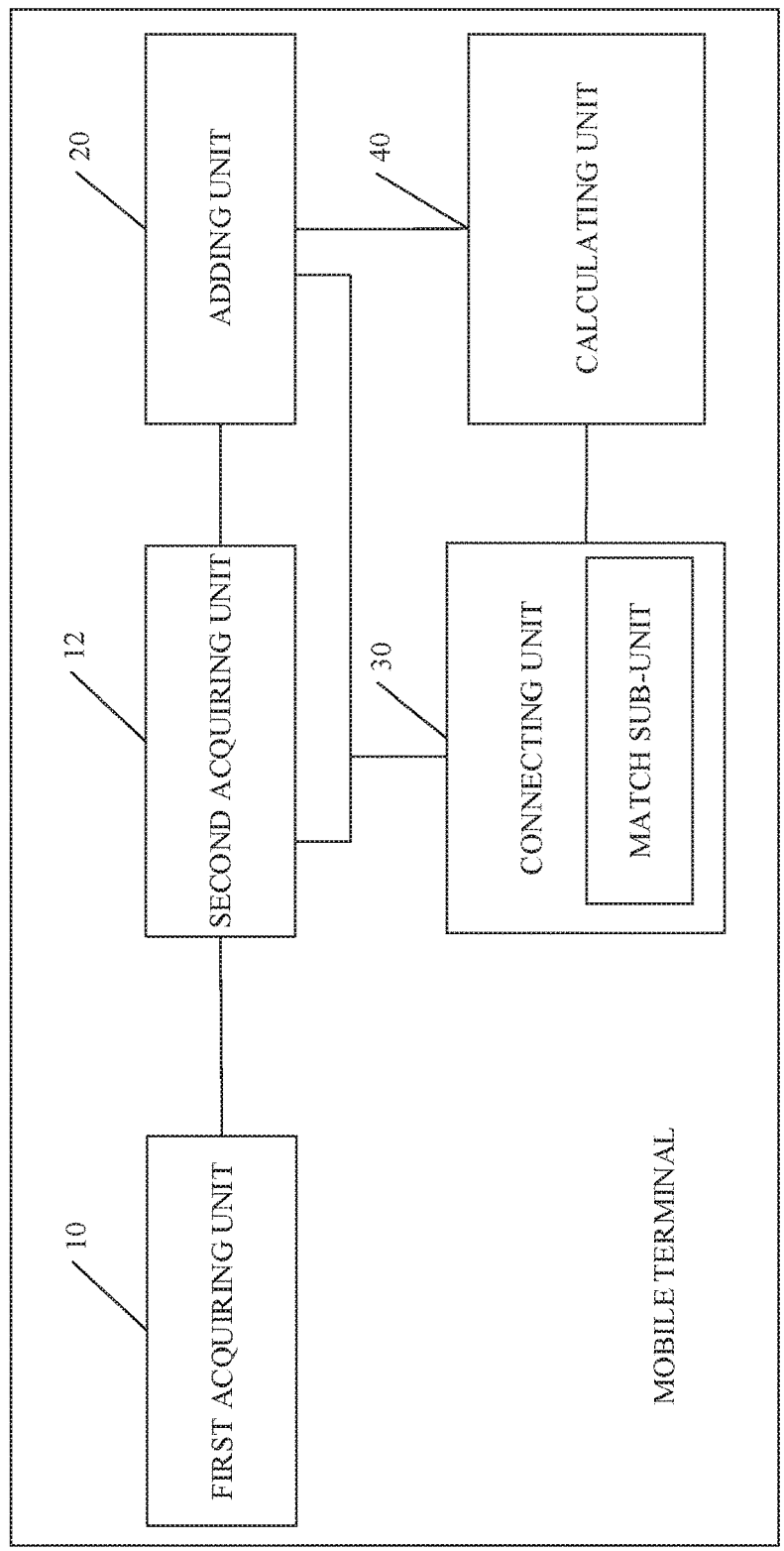
FIG. 4 is a structure diagram of another mobile terminal of an implementation of the present disclosure.

In some implementations, as illustrated in FIG. 4, the mobile terminal according to the implementation of the present disclosure can further include a calculating unit 40.

The calculating unit 40 is configured to: calculate a total length of time consumed by the mobile terminal to find the target PLMN and establish the communication connection with the target PLMN, and output the total length of time to a user operation interface of the mobile terminal as a length of time for current network access for consulting by users of the mobile terminal.

In some implementations, the "user identification card" described herein can be specifically a SIM (Subscriber Identification Module) card of a mobile phone. The information of the user identification card can include: the operator of the SIM card (for example, China Mobile, China Unicom or China Telecom, and the like), network types supported by the SIM card, and the subscriber of the SIM card (that is, the user ID of the mobile phone user bonded with the SIM card).

During implementation, the first acquiring unit 10 can pre-store the information of the SIM card of the mobile phone in a built-in storage space (that is, a build-in memory of the mobile phone), an expanded storage space (such as SD card), or a cloud storage space thereof. When the mobile phone needs to establish an EHPLMN list used for network connection, the first acquiring unit 10 can acquire the information of the SIM card from the above mentioned storage space first, based on which network types supported by the SIM card of the mobile phone (mobile phone for short) can be determined, and then a corresponding EHPLMN list can be established on the basis of the network types supported by the mobile phone.

In some implementations, the network type described herein can include: CDMA 1X, 800 MHZ frequency band assigned for mobile terminals in CDMA network standard; 900/1800/1900 MHZ frequency band assigned for mobile terminals in GSM network standard, and 900/1800 MHZ frequency band assigned for GSM 1X dual-model (that is, WCDMA) in recent years; 900/1800/1900/2100 MHz frequency band assigned for terminals in 3G mobile communication technology network standard; and 1920-2170 MHZ frequency band assigned for terminals in 4G mobile communication technology network standard; however, the present disclosure is not limited thereto.

In some implementations, after the second acquiring unit 12 has acquired the network types supported by the SIM card of the mobile terminal, the adding unit 20 can determine network IDs of PLMNs of the network types and add the network IDs of PLMNs of the network types to the EHPLMN list. That is, in implementations of the present disclosure, the second acquiring unit 12 can predetermine network IDs of PLMNs of multiple network types supported by the mobile phone, and the adding unit 20 can add the network IDs of the PLMNs of the multiple network types to the EHPLMN list as well as save the EHPLMN list to a storage space. The EHPLMN list can be used for network ID match when the mobile phone searches networks and the mobile phone can attempt to connect to a network after a corresponding network ID has been found; it is possible to reduce the length of time consumed for network search and improve the efficiency of network connection.

In some implementations, the EHPLMN described herein is an equivalent PLMN of a PLMN currently selected by the mobile phone and has the same priority. The EHPLMN is mainly used in conjunction with mobile phones to solve "periodic network search of terminals, roaming signs appears, and faster power consumption" and other issues caused by single network-dual-number or even single network-multi-number.

In some implementations, the network ID of the PLMN described herein can include one or more network number segments. For example, China Mobile includes four number segments, that is, 46000, 46002, 46007, and 46008; China Unicorn includes three number segments, that is, 46001, 46006, 46009 and the like and there is no limit. Specifically, when the network type supported by the mobile phone has been determined, the mobile phone can add network IDs of the PLMN of the network type to the EHPLMN list. For example, if the SIM card of the mobile phone is a SIM card of China Mobile, it can be determined that the network supported by the mobile phone is a network of China Mobile, and therefore, network number segments of the network of China Mobile can be added to the EHPLMN list.

Further, in some implementations, after acquiring network IDs of the PLMNs of the network types supported by the target SIM card by the second acquiring unit 12, the adding unit 20 can add network IDs of the PLMNs of said network types supported by the mobile phone to an EPLMN list; in this way, when the mobile phone arrives at a visited place and starts a network search, by searching networks via the EPLMN list, it is possible to increase the diversity of network search and increase the fun of network search.

In some implementations, when the mobile phone arrives at a visited place from the home of the SIM card thereof or arrives at a new visited place from a connected visited place and starts a network search, the connecting unit 30 can scan to acquire the network ID of a PLMN broadcasted by a base station. After obtains the network ID of the PLMN of the visited place via base station broadcast, the mobile terminal can match the network ID of the PLMN obtained via scan with network IDs of PLMNs in the EHPLMN list via the above mentioned match unit. When a PLMN (that is, the target PLMN) that matches at least one network ID of the EHPLMN list is searched, the connecting unit 30 can establish a communication connection with the target PLMN. That is, the connecting unit 30 can first match the network ID of the searched PLMN with network IDs pre-stored in the EHPLMN list via the match unit, and a network connection can be established after a successful match, there is no need to attempt communication connection for the network ID of each searched PLMN, and it is possible to reduce wasted effort and improve the efficiency of network connection.

Further, when a mobile phone arrives at a visited place and starts a network search, the connecting unit 30 can match the network ID of the searched network with network IDs in the EPLMN list and the EHPLMN list simultaneously via the match unit for example, so as to find a target PLMN that matches at least one network ID in the EPLMN list or the EHPLMN list. During implementation, since the way in which information is stored in different lists (the EPLMN list and the EHPLMN list) may be different and search strategies defined by different lists are not the same, the search speed that the mobile phone to search, from different lists (the EPLMN list and the EHPLMN list), a matched network ID of the network ID of the searched PLMN varies depending on the network IDs of PLMNs; for example, if the network ID that matches the network ID of the searched PLMN is different in storage location, the match speed between the network ID of the PLMN and network IDs in the lists may varies. According to the implementation of the present disclosure, by simultaneously matching the network ID of the searched PLMN with the EHPLMN list and the EPLMN list respectively, it is possible to improve the match efficiency of the network ID of the PLMN, shorten the match time of the network ID, and improve the efficiency of network search.

As an implementation, the connecting unit 30 can match the network ID of the searched PLMN with the network IDs in the EHPLMN list and the EPLMN list respectively, so as to obtain a network ID that matches the network ID of the PLMN; after a target PLMN that matches at least one network ID stored in the EHPLMN list or the EPLMN list is searched, a communication connection between the mobile phone and the target PLMN can be established.

In some implementations, after the connecting unit 30 establishes the communication connection with the target PLMN, the calculating unit 40 can calculate a total length of time consumed by the mobile phone to find the target PLMN and establish the communication connection with the target PLMN, and further output the total length of time to a user operation interface of the mobile terminal as a length of time for current network access for consulting by users of the mobile phone. The user operation interface of the mobile phone can be a mobile phone display such as a touch screen; however, the present disclosure is not limited thereto. After viewing the length of time for network access via the mobile phone display, users of the mobile phone can determine whether to feed back the length of time for network access, the visited place, and other information to the operator management platform of the SIM card of the mobile phone. If the mobile phone chooses to feed back the length of time for network access, the visited place, and other information to the operator management platform of the SIM card of the mobile phone via the calculating unit 40, optimal management of network access time can be performed via the operator management platform of the SIM card of the mobile phone. Through optimization, the efficiency of mobile access of the mobile phone can be improved continuously, and user experience of the mobile phone can be enhanced.

According to implementations of the present disclosure, the mobile phone can acquire information of a SIM card pre-stored by the mobile phone from a storage space and determine, on the basis of the information of the SIM card, network types supported by the mobile phone; further, the mobile phone can determine, on the basis of the network types supported by the mobile phone, network IDs of PLMNs of the above mentioned network types and add the network IDs of the PLMNs of the above mentioned network types to the EHPLMN list and the EPLMN list so as to conduct network ID match according to the EHPLMN list and the EPLMN list. Network connection will be conducted if the match is successful. Since there is no need to attempt network connection for each searched network, it is possible to improve the efficiency of network search. When the mobile phone arrives at a visited place from a designated location and starts a network search, the mobile phone can match a searched network ID with network IDs stored in the EHPLMN list and the EPLMN list. If a target PLMN that matches at least one network ID stored in the EHPLMN list or the EPLMN list is obtained, a communication connection between the mobile phone and the target PLMN will be established. Therefore, it is possible to reduce the length of time that the mobile phone takes to connect to the PLMN, and thus can enhance user communication experience on the mobile phone. According to implementations of the present disclosure, the length of time for network access can be fed back to an operator management platform of the SIM card of the mobile phone, and optimal management of network access time can be performed via the operator management platform of the SIM card. Through optimization, the efficiency of mobile access of the mobile phone can be improved continuously, and user experience of the mobile phone can be enhanced.

Modules or sub-modules in all implementations of the present disclosure can be implemented by a general purpose integrated circuit such as a CPU (Central Processing Unit), or by an ASIC (Application Specific Integrated Circuit).

The steps in the method of the implementation of the present disclosure can be sequentially adjusted, merged, and subtracted according to actual needs.

The units in the terminal of the implementation of the present disclosure can be combined, divided, and deleted according to actual needs.

It will be understood by those of ordinary skill in the art that, implementation of all or part of the processes in the method of the implementations described above can be accomplished by a computer program to instruct the associated hardware; the computer program can be stored in a computer-readable storage medium and which, when executed, may include flows of respective methods of the implementations as described above. The storage medium can be a magnetic disk, an optical disk, a read-only memory (ROM), a random access memory (RAM), or the like.

The foregoing disclosed is merely exemplary implementations and it is not intended to limit the scope of the present disclosure; equivalents changes made on the basis of the claims of the present disclosure shall fall into the scope of the present disclosure.

What is claimed is:

1. A method for network access, comprising:
   acquiring information of a user identification card pre-stored by a mobile terminal from a storage space and determining, based on pre-stored information of the user identification card, network types supported by the mobile terminal;
   determining, based on the network types supported by the mobile terminal, network identities (IDs) of Public Land Mobile Networks (PLMNs) of the network types and adding the network IDs of the PLMNs of the network types to an equivalent home public land mobile network (EHPLMN) list;
   when a target PLMN that matches at least one network ID in the EHPLMN list is found during a network search, establishing a communication connection between the mobile terminal and the target PLMN; and
   calculating a total length of time consumed by the mobile terminal to find the target PLMN and establish the communication connection with the target PLMN, and outputting the total length of time to a user operation interface of the mobile terminal as a length of time for network access for consulting by users of the mobile terminal.

2. The method of claim 1, wherein acquiring the information of the user identification card pre-stored by the mobile terminal from the storage space comprises one of:
   acquiring the information of the user identification card from a built-in storage space of the mobile terminal; and
   acquiring the information of the user identification card from a cloud storage space associated with the mobile terminal, wherein the information of the user identification card is pre-stored and backed up in the cloud storage space by the mobile terminal.

3. The method of claim 1, further comprising:
   after adding the network IDs of the PLMNs of the network types to the EHPLMN list, adding the network IDs of the PLMNs of the network types to an equivalent public land mobile network (EPLMN) list for network search of the mobile terminal.

4. The method of claim 3, further comprising:
   before establishing the communication connection between the mobile terminal and the target PLMN, matching, by the mobile terminal, the network ID of a searched network with network IDs in the EHPLMN list to find the target PLMN that matches at least one network ID in the EHPLMN list.

5. The method of claim 3, further comprising:
   before establishing the communication connection between the mobile terminal and the target PLMN, matching, by the mobile terminal, the network ID of a searched network with network IDs in the EHPLMN list and the EPLMN list simultaneously to find the target PLMN that matches at least one network ID in the EHPLMN list or a network ID in the EPLMN list.

6. The method of claim 1, further comprising:
   after outputting the total length of time to the user operation interface of the mobile terminal as the length of time for network access, feeding back to an operator management platform the length of time for network access and a visited place connected, wherein the operator management platform optimizes the length of time for network access.

7. The method of claim 1, wherein the user identification card is a subscriber identification module (SIM) card, and the information of the user identification card comprises at least one of: an operator of the SIM card, network types supported by the SIM card, and a subscriber of the SIM card.

8. The method of claim 1, wherein the network ID comprises a network number segment.

9. A mobile terminal, comprising:
   a hardware processor; and
   a memory configured to store executable program instructions which, when executed using the hardware processor, cause the hardware processor to:
   acquire information of a user identification card pre-stored by a mobile terminal from a storage space;
   acquire, based on pre-stored information of the user identification card, network types supported by the mobile terminal, and acquire, based on the network types supported by the mobile terminal, network identities (IDs) of Public Land Mobile Networks (PLMNs) of the network types;
   add the network IDs of the PLMNs of the network types to an equivalent home public land mobile network (EHPLMN) list;
   establish a communication connection between the mobile terminal and a target PLMN that matches at least one network ID in the EHPLMN list, when the target PLMN is found during a network access; and
   calculate a total length of time consumed by the mobile terminal to find the target PLMN and establish the communication connection with the target PLMN, and output the total length of time to a user operation interface of the mobile terminal as a length of time for network access for consulting by users of the mobile terminal.

10. The mobile terminal of claim 9, wherein the executable program instructions to acquire the information of the user identification card pre-stored by the mobile terminal from the storage space comprise executable instructions which, when executed, cause the hardware processor to:
    acquire the information of the user identification card from a built-in storage space of the mobile terminal; or
    acquire the information of the user identification card from a cloud storage space associated with the mobile terminal, wherein the information of the user identification card is pre-stored and backed up in the cloud storage space by the mobile terminal.

11. The mobile terminal of claim 9, wherein the executable program instructions comprise executable instructions which, when executed, further cause the hardware processor to:
  add the network IDs of the PLMNs of the network types to an equivalent public land mobile network (EPLMN) list for network search of the mobile terminal.

12. The mobile terminal of claim 11, wherein the executable program instructions comprise executable instructions which, when executed, further cause the hardware processor to:
  match the network ID of a searched network with network IDs in the EHPLMN list to find the target PLMN that matches at least one network ID in the EHPLMN list; or
  match the network ID of the searched network with network IDs in the EPLMN list and the EHPLMN list simultaneously to find the target PLMN that matches at least one network ID in the EPLMN list or a network ID in the EHPLMN list.

13. The mobile terminal of claim 9, wherein the executable program instructions comprise executable instructions which, when executed, further cause the hardware processor to:
  feed back to an operator management platform the length of time for network access and a visited place connected, wherein the operator management platform optimizes the length of time for network access.

14. A non-transitory computer readable storage medium, configured to store one or more programs when executed by a processor become operational with the processor to:
  acquire information of a user identification card pre-stored by a mobile terminal from a storage space and determining, based on pre-stored information of the user identification card, network types supported by the mobile terminal;
  determine, based on the network types supported by the mobile terminal, network identities (IDs) of Public Land Mobile Networks (PLMNs) of the network types and add the network IDs of the PLMNs of the network types to an equivalent home public land mobile network (EHPLMN) list;
  when a target PLMN that matches at least one network ID in the EHPLMN list is found during a network search, establish a communication connection between the mobile terminal and the target PLMN; and
  calculate a total length of time consumed by the mobile terminal to find the target PLMN and establish the communication connection with the target PLMN, and output the total length of time to a user operation interface of the mobile terminal as a length of time for current network access for consulting by users of the mobile terminal.

15. The non-transitory computer readable storage medium of claim 14, wherein the one or more programs are configured to:
  after adding the network IDs of the PLMNs of the network types to the EHPLMN list add the network IDs of the PLMNs of the network types to an equivalent public land mobile network (EPLMN) list for network search of the mobile terminal.

16. The non-transitory computer readable storage medium of claim 14, wherein the one or more programs are configured to:
  before establishing the communication connection between the mobile terminal and the target PLMN match, by the mobile terminal, the network ID of a searched network with network IDs in at least one of the EHPLMN list and an equivalent public land mobile network (EPLMN) list to find the target PLMN that matches at least one network ID in the EHPLMN list or a network ID in the EPLMN list.

* * * * *